Jan. 6, 1925.
L. C. BURTON
KITCHEN SINK
Filed Dec. 13, 1923
1,522,045
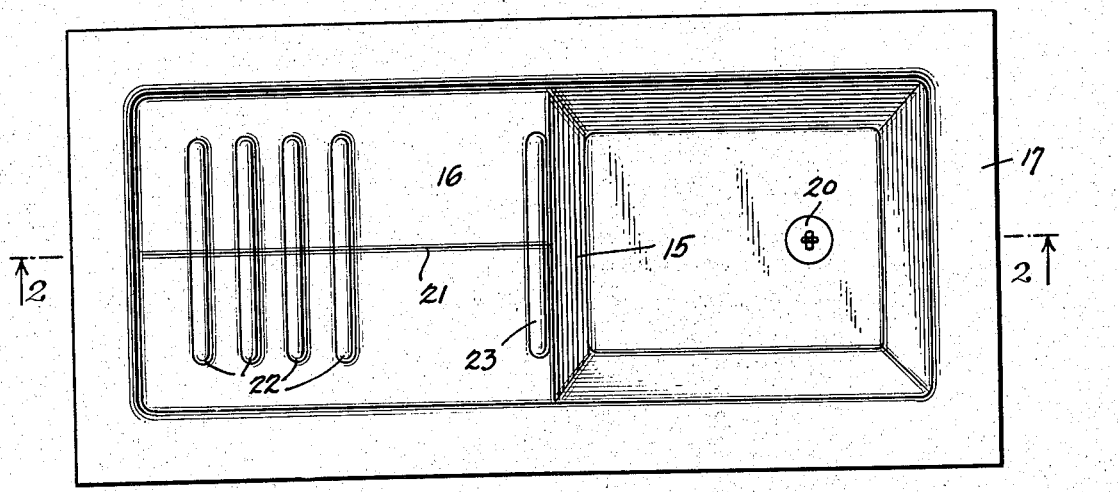
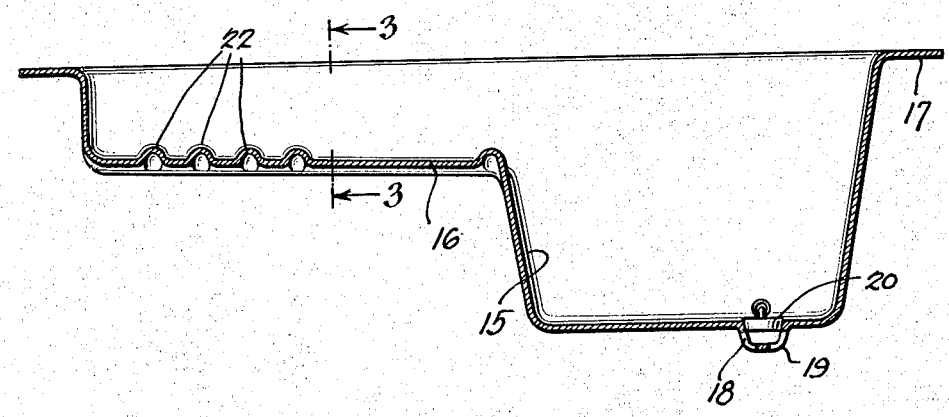
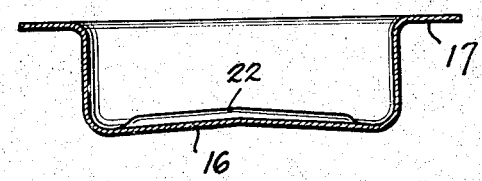
INVENTOR
LEONARD C. BURTON
BY Munn & Co.
ATTORNEYS Patented Jan. 6, 1925.

1,522,045

UNITED STATES PATENT OFFICE.

LEONARD C. BURTON, OF LOS ANGELES, CALIFORNIA.

KITCHEN SINK.

Application filed December 13, 1923. Serial No. 680,553.

*To all whom it may concern:*

Be it known that I, LEONARD C. BURTON, a citizen of the United States, and a resident of Los Angeles, in the county of Los Angeles and State of California, have invented certain new and useful Improvements in Kitchen Sinks, of which the following is a specification.

My invention relates to kitchen sinks, and the purpose of my invention is the provision of a sink having a relatively deep portion or well which serves as a dish pan or receptacle in which dishes can be washed and drain board upon which the dishes, after being washed, can be placed for scalding and drying. The drain board constitutes an integral part of the sink and is provided with protuberances, one protuberance at the junction of the board and receptacle which serves to prevent sliding of the dishes into the receptacle, and a group of other protuberances which serve to support the dishes in slightly spaced relation to the board so that the drainage of water from the dishes can be effected. Further, the drain board is inclined in the direction of the receptacle and also in opposite directions to the longitudinal axis of the board to insure drainage of water from between the protuberances.

I will describe only one form of sink embodying my invention and will then point out the novel features thereof in claims.

In the accompanying drawings,

Figure 1 is a view showing in top plan one form of sink embodying my invention;

Figure 2 is a longitudinal sectional view taken on the line 2—2 of Figure 1;

Figure 3 is a transverse sectional view taken on the line 3—3 of Figure 2.

Referring specifically to the drawings, in which similar reference characters refer to similar parts, my invention, in its present embodiment, comprises a single casting constructed to provide a relatively deep receptacle 15 and a drain board 16. A supporting flange 17 is formed on the edge of the casting, and with the board 16 below the flange and the receptacle 15 below the board. The receptacle 15 is formed with a drain opening 18 spanned by a depending strainer 19 and adapted to receive a plug 20.

The drain board 16 is, as clearly shown in Figure 2, inclined toward the receptacle 15 so that water deposited on the drain board will gravitate into the receptacle. The drain board is also inclined in opposite directions transversely from the longitudinal axis of the board or from the line 21 (Figure 1).

For the purpose of supporting dishes in slightly spaced or elevated relation to the drain board so that the water can drain from the dishes and from the board, I provide the board with a group of transversely extending protuberances which, in the present instance, are shown as ribs 22 arranged in spaced relation to each other and with their ends in spaced relation to the sides of the drain board, so that water can drain from between the ribs and pass the same downwardly of the board. This drainage is facilitated by virtue of the double inclination of the board from the medial line 21.

To prevent the sliding of dishes from the drain board into the receptacle, the board is also formed with a transverse rib 23 at the junction of the board with respect to the receptacle. The ends of this rib terminate in spaced relation to the sides of the drain board so that water from the board can drain around the opposite ends of the rib and downwardly into the receptacle. The space between the group of ribs 22 and the rib 23 can be employed for the supporting of dishes of a character in which it is unnecessary that they be sustained in spaced relation to the board to effect drainage; or the ribs 22 can be increased in number so as to traverse the entire length of the drain board so as to support all of the dishes in slightly elevated position.

In practice, the sink is adapted to be arranged so that the usual faucets are directly above the receptacle 15, so that the receptacle can be filled with water for the washing of dishes. The dishes having been washed within the receptacle 15 can be placed upon the board 16 for subsequent scalding. The inclination of the board both longitudinally and transversely insures proper drainage of water from the board into the receptacle, and thus facilitates the drying of dishes.

Although I have herein shown and described only one form of kitchen sink embodying my invention, it is to be understood that various changes and modifications may be made herein without departing from the spirit of the invention and the spirit and scope of the appended claims.

What is claimed is:

1. A sink comprising a dish washing receptacle, and a drain board inclined in the direction of the receptacle and formed with transversely extending protuberances, one of said protuberances being at the junction of the board and receptacle and the remaining protuberances considerably spaced from the last mentioned protuberances and arranged in spaced relation to each other.

2. A sink comprising a dish washing receptacle, and a drain board inclined longitudinally in the direction of the receptacle and transversely in opposed directions from its longitudinal axis.

3. A sink comprising a dish washing receptacle, and a drain board inclined longitudinally in the direction of the receptacle and transversely in opposed directions from its longitudinal axis, and protuberances formed on the board and extending transversely thereof.

4. A sink comprising a dish washing receptacle, a drain board inclined longitudinally in the direction of the receptacle and transversely in opposed directions from its longitudinal axis, a rib on the board at the junction of the board and receptacle, said rib extending transversely of the board and having its ends spaced from the sides of the board.

5. A sink comprising a dish washing receptacle, a drain board inclined longitudinally in the direction of the receptacle and transversely in opposed directions from its longitudinal axis, a rib on the board at the junction of the board and receptacle, and a group of ribs on the board spaced from the first rib and from each other, all of said ribs extending transversely of the board with their ends terminating short of the sides of the board.

LEONARD C. BURTON.